US009675001B2

(12) United States Patent
Meyer et al.

(10) Patent No.: US 9,675,001 B2
(45) Date of Patent: Jun. 13, 2017

(54) SEED DISTRIBUTOR FOR EVEN DISPERSION AT VARYING FLOW RATES

(71) Applicants: Dominic E Meyer, Sabetha, KS (US); Jason P Kaeb, Sabetha, KS (US); Bradley S Strahm, Sabetha, KS (US); Paul A Kaeb, Sabetha, KS (US)

(72) Inventors: Dominic E Meyer, Sabetha, KS (US); Jason P Kaeb, Sabetha, KS (US); Bradley S Strahm, Sabetha, KS (US); Paul A Kaeb, Sabetha, KS (US)

(73) Assignee: KSi Conveyor, Inc., Sabetha, KS (US)

( * ) Notice: Subject to any disclaimer, the term of this patent is extended or adjusted under 35 U.S.C. 154(b) by 0 days.

(21) Appl. No.: 14/837,752

(22) Filed: Aug. 27, 2015

(65) Prior Publication Data

US 2016/0060039 A1 Mar. 3, 2016

Related U.S. Application Data

(60) Provisional application No. 62/043,510, filed on Aug. 29, 2014.

(51) Int. Cl.
*B65G 11/02* (2006.01)
*B65G 11/18* (2006.01)
*A01C 1/00* (2006.01)

(52) U.S. Cl.
CPC .................................... *A01C 1/00* (2013.01)

(58) Field of Classification Search
CPC ........ B65G 11/026; B65G 11/186; A01C 1/00
USPC ........ 198/540, 541; 222/434, 451, 482, 484, 222/485; 193/2 C, 2 D, 2 R
See application file for complete search history.

(56) References Cited

U.S. PATENT DOCUMENTS

| | | | | | |
|---|---|---|---|---|---|
| 3,576,262 | A | * | 4/1971 | Konchesky | B65G 69/00 193/3 |
| 3,576,263 | A | * | 4/1971 | Abendroth | C10B 31/04 193/30 |
| 3,921,831 | A | * | 11/1975 | Takahashi | C21B 7/20 193/16 |
| 4,042,130 | A | * | 8/1977 | Legille | C21B 7/20 137/801 |
| 4,206,855 | A | * | 6/1980 | Foster | B65D 88/28 222/482 |
| 4,275,682 | A | * | 6/1981 | Weber | A23N 15/06 118/303 |
| 4,596,206 | A | * | 6/1986 | Berge | A01C 1/08 118/303 |
| 4,657,773 | A | | 4/1987 | Mueller | |
| 5,226,775 | A | * | 7/1993 | Bohle | B65B 37/02 193/32 |

(Continued)

*Primary Examiner* — Douglas Hess
(74) *Attorney, Agent, or Firm* — Daniel J Coughlin; Coughlin Law Office

(57) ABSTRACT

Existing seed treatment applicators distribute seed into an uneven annular veil and results in wasted seed treatment fluid and unnecessarily long mixing/drying times. We developed a seed distribution apparatus comprising a partially porous, frustoconical restricting assembly that is mounted above and partially receives a conical distributing assembly. The orientation of the distributor and restricting assemblies provides three different seed flow paths to provide a substantially even annular veil of seed to the seed treatment housing.

20 Claims, 4 Drawing Sheets

(56) References Cited

U.S. PATENT DOCUMENTS

| | | | | |
|---|---|---|---|---|
| 5,891,246 | A * | 4/1999 | Lund | A01C 1/06 118/13 |
| 5,993,903 | A * | 11/1999 | Toepfer | A01C 1/06 118/303 |
| 6,188,936 | B1 * | 2/2001 | Maguire | B01F 3/18 222/57 |
| 6,551,402 | B1 | 4/2003 | Renyer et al. | |
| 7,077,906 | B2 * | 7/2006 | Colombo | B01F 5/0602 118/303 |
| 7,273,314 | B1 * | 9/2007 | Whited | B01F 5/223 118/303 |
| 7,487,892 | B1 * | 2/2009 | Hirsch | A01C 1/00 222/240 |
| 9,038,861 | B2 * | 5/2015 | Renyer | B65G 65/4872 222/185.1 |

* cited by examiner

SEED DISTRIBUTOR FOR EVEN DISPERSION AT VARYING FLOW RATES

CROSS-REFERENCES

Not Applicable.

GOVERNMENT RIGHTS

Not Applicable.

REFERENCE TO CDS

Not Applicable.

FIELD OF THE INVENTION

The present invention is in the technical field of regulating the flow rate and dispersion pattern of a particulate matter, such as seed flow within a seed treatment applicator.

BACKGROUND

Seeds planted for agricultural and other purposes are often treated with an agrichemical such as insecticides, inoculants, micronutrients or other beneficial compositions prior to planting. Treatment may accomplish various purposes including inhibiting the growth of insects, bacteria, molds, fungus, and parasites that are destructive to the seed and plant growth. Seed treatments are commonly applied by spraying a liquid composition to the surface of seed as the seed falls through a seed treatment applicator. Direct application of the seed treatment fluid to the seed before planting requires a smaller quantity of seed treatment composition than the traditional field application of treatment fluids.

SUMMARY

Direct application of the seed treatment fluid to the seed before planting requires a smaller quantity of seed treatment composition than the traditional field application of treatment fluids. An ideal treatment applicator system applies treatment fluid uniformly across the surface of the seed thereby minimizing the time the treated seed needs to be mixed in a mixing/drying drum to ensure complete and even coverage of the treatment fluid.

Seed flows into the applicator under the force of gravity. A metered quantity of seed flows into the applicator, first into a distribution housing and then into a treatment housing. In the treatment housing, airborne droplets of treatment fluid are applied to the seed surface using an atomizer.

Upon entering the applicator, the seed flow is directed into an annular veil in the distribution housing by means of a conical distributing assembly. The atomizer—positioned below the distributing assembly—sprays droplets of treatment fluid from the center of the treatment housing outwardly. These airborne droplets make contact the interior perimeter of the annular veil of seed.

However, in existing treatment applicators the seed often flows unevenly over the conical housing. This results in uneven annular veil of seed and an uneven application of the seed treatment fluid. Treatment systems commonly rely on a rotating mixing drum to compensate for uneven application of the seed treatment to the seed flow. This results in longer seed drying/mixing times and can result in wasted seed treatment fluid.

We solved this problem by incorporating a restricting assembly within the seed distribution housing of the applicator. The restricting assembly retains at least a portion of the seed that flows into the seed distribution housing. The distributing assembly is partially disposed within the restricting assembly. The restricting assembly has a downwardly converging frustoconical surface comprising a lower retaining portion, a porous portion, and an upper retaining portion. A first seed flow path is defined by the lower retaining portion of the restricting assembly and the downwardly diverging conical surface of the distributing assembly. The first seed flow path provides a substantially even annular veil of seed. At low seed flow rates, up to approximately 700 to 1,000 pounds per minute, the seed flows through the seed distribution housing primarily through the first seed flow path.

The restricting assembly redirects seed flow, limiting lateral motion of the incoming seed flow and directing the seed flow to fall substantially vertically over the distributing assembly and through the distribution housing and the treatment housing. However, it is important that seed flow rate is not vertically restricted for extended periods of time, especially at higher seed flow rates. This is important because the atomizer applies the treatment fluid in response to the measured flow rate of seed entering the seed distribution housing.

In order to minimize the retention of seed in the distribution housing, we added a porous portion to the restricting assembly. The porous portion can comprise a plurality of seed outlet openings. Collectively, the seed outlet openings define a second seed flow path. The size, shape, and placement of these seed outlet openings, in combination with the first seed flow path, allow seed to flow through the distributor at a medium seed flow rate. The medium seed flow rate can range from at least 700 to 1,000 pounds per minute up to approximately 1,800 pounds per minute.

Under high seed flow rates—rates in excess of 1,800 pounds per minute—the seed will flow through the first seed flow path, through the second seed flow path, and begin to flow over the top retaining portion of the restricting assembly. A third seed flow path is defined by the radial space between the upper inlet end of the restricting assembly and the interior surface of the distribution housing.

The seed flow rate through the first seed flow path can be adjusted by adjusting the position of the restricting assembly relative to the distributing assembly. At least one of the restricting assembly and the distributing assembly can be adjustably mounted within the seed distribution housing. The restricting assembly can be adjustably mounted at a predetermined height above the distributing assembly, such that the lower retaining portion of the restricting assembly partially receives a portion of the distributing assembly. As described above, the first seed flow path is defined by the annular space between the lower retaining portion of the restricting assembly and the downwardly diverging conical surface of the distributing assembly. The lower retaining portion is oriented to at least partially restrict seed flow through the first seed flow path such that the restricted seed accumulates within the restricting assembly and flows through the at least one of the seed outlet openings. Adjustments to the position of either the restricting assembly or the distributing assembly affect the flow rate of seed through the first seed flow path.

The width of the first seed passage can be adjusted based on the seed type, seed size, or to achieve a targeted seed flow rate through the first seed flow path. In one embodiment, the width of the first seed passage can range from 0.25 inches to 1.0 inch. In a preferred embodiment, the width of the first seed flow passage is between 0.625 inches to 0.75 inches. In another embodiment, the width of the first seed flow passage is determined based on flow rate of the seed, for example the width of the first seed flow passage permits seed flow up to 700 pounds per minute.

The seed flow rate through the second seed flow path can be adjusted by altering the configuration of the porous portion of the restricting assembly. The size, number, and shape of the seed outlet openings in the restricting assembly can be configured such that the discharge rate of seed flow through the first seed flow passage and through the perforations is sufficient to achieve a medium seed flow rate. In a preferred embodiment, at least one-half of the surface area of the frustoconical surface of the restricting assembly comprises seed outlet openings. The pitch of the downwardly converging frustoconical surface may also be altered to present a more vertical or a more horizontal seed outlet opening. In a preferred embodiment, the angle of the downwardly converging frustoconical surface is approximately 30° from vertical.

BRIEF DESCRIPTION OF THE DRAWINGS

Aspects are illustrated by way of example, and not by way of limitation, in the accompanying drawings, wherein.

DETAILED DESCRIPTION

Figure 1:
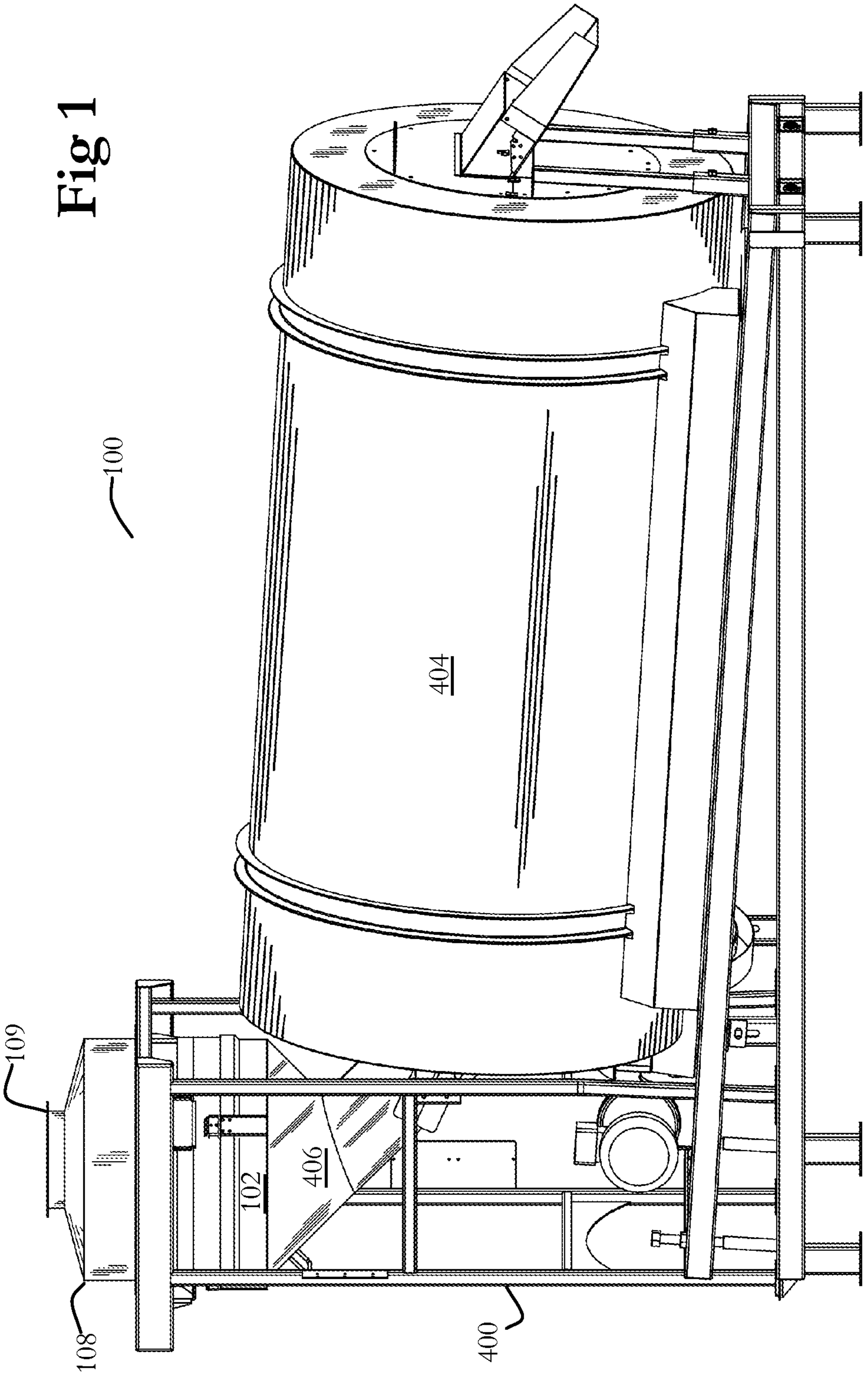
FIG. 1 is a side perspective view of the seed treatment applicator.

The seed treatment applicator 100 is shown in FIG. 1. A regulated flow of seed enters into the applicator 100 from above. The seed flows into a seed distribution housing 108 through a seed inlet 109. The seed inlet path is shown in cutaway in FIG. 2.

Figure 2:
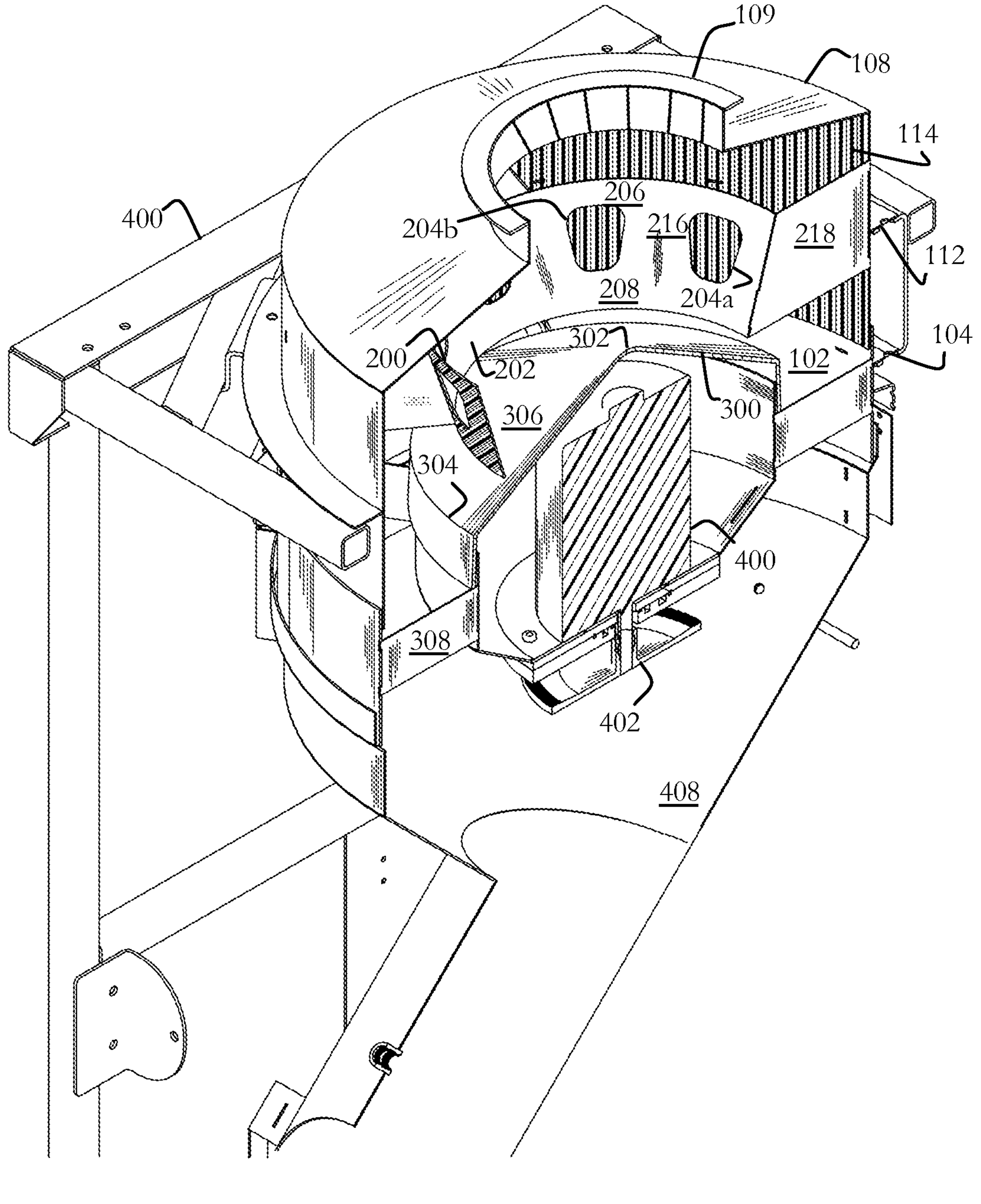
FIG. 2 is an elevated side perspective cutaway of the distribution housing and the treatment housing.
Figure 3:
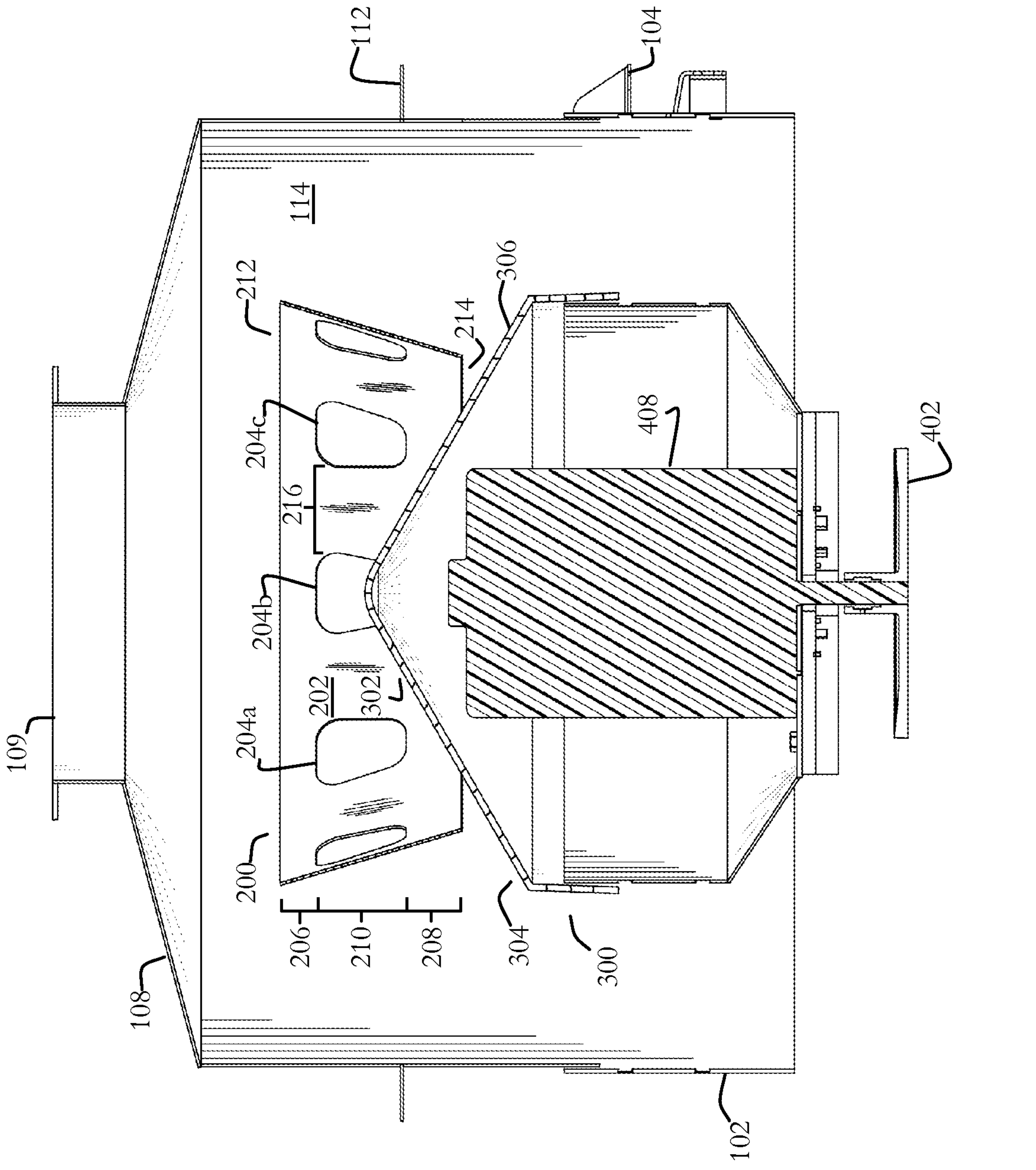
FIG. 3 is a side perspective cutaway of the distribution housing and the treatment housing.

The seed flow is shaped within the distribution housing 108—which is shown in cutaway in FIGS. 2 and 3. First, the seed encounters a distributing assembly 300. The distributing assembly 300, as shown in FIGS. 2-4, has a downwardly diverging conical surface 306, a narrow upper portion 302 and a wide lower portion 304.

After the seed flow is shaped into an annular veil, the seed flows into a seed treatment housing 102. An atomizer 402 applies fluid seed treatment to the annular veil of seed within the seed treatment housing 402. The treated seed then flows through a transition housing 406 and into a mixing/drying drum 404. Treatment fluid is then applied to the annular veil of seed in the seed treatment housing 102.

In existing applicators, the seed is allowed to fall disproportionately over one side of the distributing assembly 300. This creates an uneven annular veil of seed flow, which results in an uneven application of seed treatment fluid, wastes valuable seed treatment fluid, and requires longer mixing time in the mixing/drying drum 404.

Figure 4:
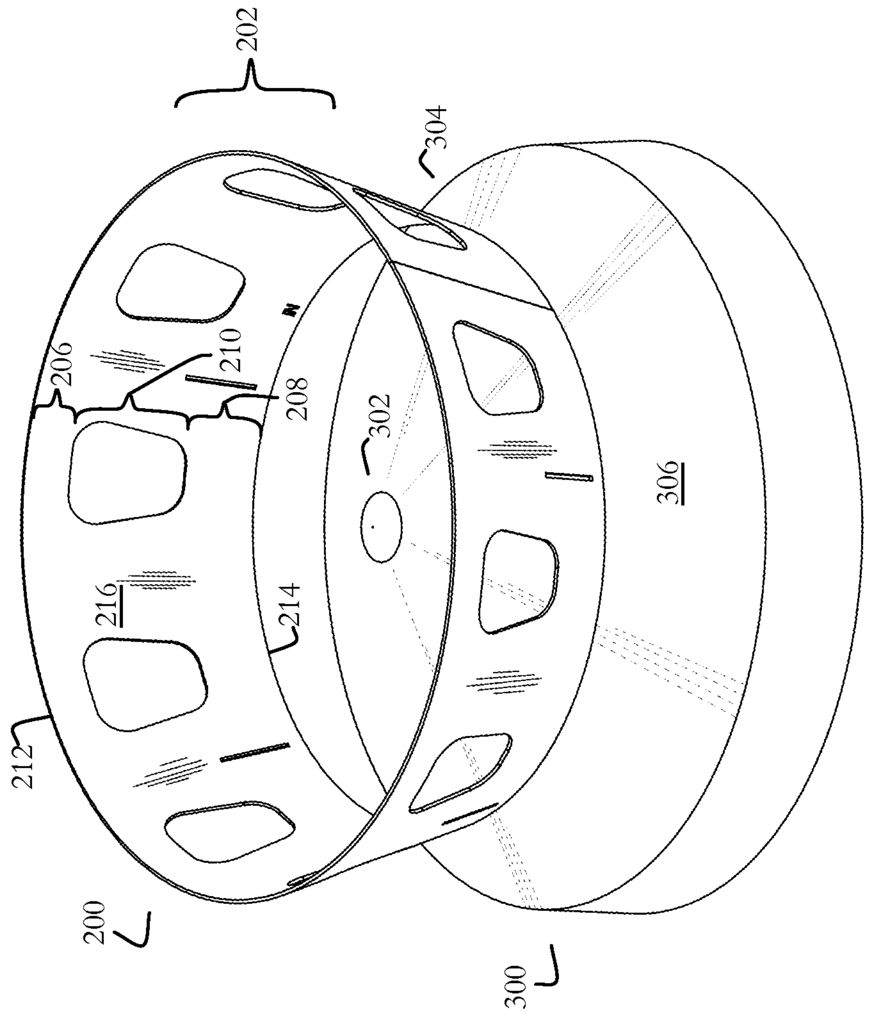
FIG. 4 is an elevated side perspective of the restricting assembly and the distributing assembly.

As illustrated in FIGS. 2-4, the present disclosure provides the seed treatment applicator with a substantial even annular veil of seed by directing the seed flow through multiple seed flow paths through the use of a restricting assembly 200. As shown in FIGS. 2-4, the restricting assembly 200 has a downwardly converging frustoconical surface 202. The downwardly converging frustoconical surface 202 has an upper retaining portion 206, a lower retaining portion 208, and a porous portion 210. The restricting assembly 200 also has an upper opening 212 for receiving a flow of seed and a lower opening 214.

The restricting assembly 200 is positioned within the distributing housing 108 such that at least a portion of the distributing assembly 300 is partially inserted within the lower opening 214 of the restricting assembly 200. As shown in FIGS. 2-4, the upper narrow portion 302 of the distributing assembly 300 is disposed within the restricting assembly 200 and a wide lower portion 304 of the distributing assembly 300 is not disposed within the restricting assembly 200. In a preferred embodiment, the wide lower portion 304 of the distributing assembly 300 radially extends beyond the lower retaining portion 208 of the restricting assembly 200.

A first seed flow path through the distribution housing 108 is defined by the annular opening between the lower retaining portion 208 of the restricting assembly and the downwardly diverging conical surface 306 of the distributing assembly 300. At low seed flow rates the seed flow travels primarily through this first seed flow path.

As the seed flow enters the distribution housing, the seed flow is received through the seed inlet 109. The seed flow then enters the interior of the restricting assembly 200. The lower retaining portion 208 is oriented to at least partially restrict seed flow through the lower opening 214 such that the restricted seed accumulates within the restricting assembly 200. The lower retaining portion 208 also restricts lateral movement of the seed flow. At low seed flow rates—in one embodiment up to approximately 700 to 1,000 pounds per minute—the entire seed flow is capable of flowing through this first seed flow path. The width of the first seed flow path can be adjusted, as discussed below.

The restricting assembly 200 temporarily restricts the seed flow, in order to direct the seed flow through the first seed flow path. The restricting assembly 200 adequately restricts lateral motion of the seed flow and directs the seed flow vertically over the distributing assembly 300. However, it is important that seed flow rate is not vertically restricted for extended periods of time, especially at higher seed flow rates. This is important because a controller (not shown) regulates the fluid treatment flow rate to the atomizer 402 in response to the measured flow rate of seed entering the applicator 100.

A second seed flow path minimizes the retention of seed within the restricting assembly 200 at higher seed flow rates. The second seed flow path is defined by a plurality of seed outlet openings 204 through the porous portion 210 of the restricting assembly 200. The even distribution of the seed outlet openings 204 about the downwardly converging frustoconical surface 202 maintains the even annular veil of the seed flow. At medium seed flow rates, seed flows through the first seed flow path and the second seed flow path. In one embodiment, the medium seed flow rate is between 700 pounds per minute and 3,000 pounds per minute. In a preferred embodiment, at least one-half of the surface area of the frustoconical surface 202 of the restricting assembly 200 comprises seed outlet openings 204.

As seed flows into the restricting assembly 200 at medium seed flow rates, the seed flow is restricted such that the seed accumulates over the top of the lower retaining portion 208. Seed then begins to flow through the at least one of the seed outlet openings 204. As shown in FIGS. 2-4, the seed outlet openings are defined by the upper retaining portion 206, the lower retaining portion 208, and a plurality of ribs 216. The ribs 216 continue to partially restricts the seed flow through the distribution housing 108, thereby restricting lateral motion of the seed flow and facilitating seed flow through the evenly spaced seed outlet openings 204.

A third seed flow path allows seed to flow through the distribution housing 108 under high seed flow rates—in one embodiment, high seed flow is a rate in excess of 3,000 pounds per minute. The third seed flow path is defined by the radial space between the upper retaining portion 206 of the restricting assembly 200 and an interior surface 114 of the seed distribution housing 108. At high seed flow rates the seed flows through the first seed flow path, the second seed flow path, and the third seed flow path to produce the annular veil of seed flow to the atomizer.

As shown in FIGS. 2-4, at least certain portions of the distributing assembly 300 are received within lower opening 214 of the restricting assembly 200. When partially received, the narrow upper portion 302 is received within the restricting assembly 200 and the wide lower portion 304 is not received within the restricting assembly 200. In one embodiment, the wide lower portion 304 of the distributing assembly 300 radially extends beyond the lower retaining portion 208 of the restricting assembly 200. In another embodiment, the wide lower portion 304 of the distributing assembly 300 radially extends beyond the upper retaining portion 208 of the restricting assembly 200.

In the illustrated embodiment, the distributing assembly 300 is mounted to the treatment housing 102 with a plurality of brackets 308. The restricting assembly is similarly mounted to the seed distribution housing 108 with a plurality of brackets 218. These brackets 308, 218 are depicted as welded metal plates that mount the respective assembly to the respective housing. It should be apparent to one skilled in the art that these mounts 210 may be a variety of mechanisms, such as welded rods or fasteners such as bolts or screws. As illustrated, the distribution housing 108 is mounted to the applicator structure 400 with a fastener that passes through an flange 109 and is received by the applicator frame 106. The structure 400 is illustrated as supporting the seed distribution housing above the seed treating portion of the seed treater The seed flow rate through the first seed flow path can be adjusted by changing the orientation of the restricting assembly 200 relative to the distributing assembly 300. At least one of the restricting assembly and the distributing assembly can be mounted on a vertically adjustable mount upon the structure 400 such that the orientation between the restricting assembly 200 and the distributing assembly 300 is adjustable. For example, seed flow rate can be adjusted by raising or lowering the restricting assembly 200. As shown in FIGS. 2-3, the restricting assembly 200 is mounted to the seed distribution housing 108 with a plurality of mounting brackets 218. The seed distribution housing 108 is mounted upon the structure 400 with a flange 112 and a fastener (not shown) that passes through the flange 112 and is received by the structure 400. One or more washers (not shown) can be inserted between the upper housing 109 and the applicator frame 106 to raise or lower the distribution housing 108. It should be apparent to one skilled in the art that these height adjustment mechanism may be a variety of mechanisms, such as hydraulic cylinders, fasteners such as bolts or screws, inclined planes, or levers. As the distribution housing 108 is raised or lowered, the restricting assembly 200 is raised or lowered. Raising or lowering the restricting assembly 200 relative to the distributing assembly 300 changes the width of the first seed flow passage due to the downwardly diverging conical surface 306 of the distributing assembly 300. The width of the first seed flow passage can range from 0.25 inches to 1.0 inch. In a preferred embodiment, the width of the first seed passage is between 0.625 inches to 0.75 inches and permits seed flow up to 700 pounds per minute. The minimum width of the first seed flow path prevents seed buildup and allows a sufficient seed flow into the seed treatment housing 102.

The width of the first seed flow passage can be adjusted based on the seed type or seed size, to achieve the targeted low seed flow rate. For example, the size of wheat seed is much smaller than bean or corn seed. For another example, the size of a certain variety of seed can vary between batches. In order to accommodate different seed varieties or seed sizes and maintain the flow rate, the restricting assembly 200 can be adjustably mounted relative to the distributing assembly 300.

In another embodiment, the restricting assembly 200 can be mounted upon a graduated ramp that allows the restricting assembly 200 or the distribution housing 108 to be rotated to modify the height of the restricting assembly 200 relative to the distributing assembly 300. The graduated ramp can have alternating inclined ramp portions and level portions. The graduated ramp allows the restricting assembly 200 to be adjustable—by rotation—to discrete predetermined heights—or steps—relative to the distributing assembly 300, and thereby adjusting the maximum seed flow rate through the first seed flow path.

In another embodiment, the distance between the restricting assembly 200 and the distributing assembly 300 can be adjusted with an actuator, such as a hydraulic, pneumatic, or mechanical actuator. The actuator adjusts the height of the restricting assembly 200 relative to the distributing assembly 300, and thereby controls the maximum seed flow rate through the first seed flow passage 220.

The size of the seed outlet openings 204 in the restricting assembly 200 is configured such that the sum discharge rate of seed flow through the first seed flow passage and through the perforations is sufficient to achieve a medium seed flow rate. In one embodiment, the surface area of the perforations in the sidewall corresponds to approximately one-half of the surface area of the sidewalls and permits seed flow up to approximately 3,000 pounds per minute. The pitch of the downwardly converging frustoconical surface can also be altered to present a more vertical or a more horizontal seed outlet opening. In a preferred embodiment, the angle of the downwardly converging frustoconical surface is approximately 30° from vertical.

The restricting assembly 200 is preferably made of a rigid material, such as steel, aluminum, or plastic. The distributing assembly 300 is also made of a rigid material—in a preferred embodiment the distributing assembly 300 is made of a plastic. The plastic decreases seed damage, less impact as seed falls. The distributing assembly 300 is mounted over the motor 400. The angle of the downwardly diverging conical surface 306 of the distributing assembly 300 is such that prevents seed buildup and directs the seed flow into an annular veil.

In another embodiment, the restricting assembly 200 is mounted to a bearing (not shown) that allows the restricting assembly 200 to rotate within distribution housing 108. The restricting assembly 200 rotates continuously under seed flow. An angled flute (not shown) can be mounted to each of the perforations 204 in the restricting assembly 200 and rotate with the restricting assembly 200. The rotating angled flutes would provide even flow rate of seed about the central vertical axis under medium seed flow rates.

The tip of the seed distribution housing is described as conical. As used in this document, conical can refer to a shape where the narrow end is rounded, flattened, or pointed. As used in this document, frustoconical means having the shape of a cone with a portion of the narrow end—or tip—removed.

In the Summary above, the Detailed Description, and in the accompanying drawings, reference is made to particular features of the invention. The reader should understand that the disclosure of the invention in this specification includes all possible combinations of such particular features. For example, where a particular feature is disclosed in the context of a particular aspect or embodiment of the invention, or a particular claim, that feature can also be used, to the extent possible, in combination with and/or in the context of other particular aspects and embodiments of the invention, and in the invention generally.

The term "comprises" and its grammatical equivalents are used in this document to mean that other components, steps, etc. are optionally present. For example, an article "comprising" or "which comprises" components A, B, and C can consist of components A, B, and C, or can contain not only components A, B, and C but also one or more other components.

We claim:

1. An apparatus for providing an even annular flow of seed within a seed treatment applicator comprising:

a. a seed distribution housing having a seed inlet;

b. a distributing assembly having a downwardly diverging conical surface, the distributing assembly being mounted within the seed distribution housing; and c. a restricting assembly having a lower opening and a downwardly converging frustoconical surface and having a plurality of seed outlet openings through the downwardly converging frustoconical surface of the restricting assembly, and at least certain portions of the distributing assembly are received within the restricting assembly;

d. structure supporting the seed distribution housing above the seed treating portion of the seed treatment applicator.

2. The apparatus of claim 1, wherein at least one of the restricting assembly and the distributing assembly is vertically adjustably mounted within the seed distribution housing.

3. The apparatus of claim 1, wherein a top narrow portion of the distributing assembly is disposed within the restricting assembly and a wide lower portion of the distributing assembly is not disposed within the restricting assembly.

4. The apparatus of claim 3, wherein the wide lower portion of the distributing assembly radially extends beyond a lower retaining portion of the restricting assembly.

5. The apparatus of claim 1, wherein the downwardly converging frustoconical surface of the restricting assembly further comprises a lower retaining portion to at least partially restrict seed flow through seed distribution housing.

6. The apparatus of claim 5, a first seed flow path is defined by the annular opening between the lower restraining portion of the restricting assembly and the downwardly diverging conical surface of the distributing assembly.

7. The apparatus of claim 6, wherein the restricting assembly and the distributing assembly are oriented such that the width of the first seed flow path is between approximately 0.5 inches to 1.0 inch.

8. The apparatus of claim 5, wherein:

a. the restricting assembly further comprises an upper restraining portion of the restricting assembly; and b. the seed outlet openings are defined by the lower restraining portion, the upper restraining portion, and corresponding rib sections that extend therebetween.

9. The apparatus of claim 8, wherein the restricting assembly further comprises:

a. an upper opening for receiving a flow of seed;

b. a lower opening that at least partially receives at least certain portions of the distributing assembly;

c. wherein lower retaining portion is oriented to at least partially restrict seed flow through the lower opening such that the restricted seed accumulates within the restricting assembly and flows through the at least one of the seed outlet openings.

10. The apparatus of claim 9, wherein at least one-half of the surface area of the frustoconical surface of the restricting assembly comprises seed outlet openings.

11. A seed distributor for distributing seed flow within a seed treatment applicator comprising:

a. a restricting assembly mounted within a seed distribution housing and comprising:

i. an upper retaining portion;

ii. a lower retaining portion having a reduced diameter; and iii. a plurality of ribs connecting the upper retaining portion and the lower retaining portion and thereby defining a plurality of seed outlet openings;

b. a distributing assembly having a downwardly diverging conical surface and mounted within the seed treatment housing with at least certain portions thereof received within the lower retaining portion of the restricting assembly;

c. a first seed flow path defined by the radial space between the lower retaining portion of the restricting assembly and the downwardly diverging conical surface of the distributing assembly;

d. a second seed flow path is defined by the plurality of seed outlet openings.

12. The seed distributor of claim 11, wherein at least one of the restricting assembly and the distributing assembly has a vertically adjustable mount such that the width of the first seed flow path is adjustable.

13. The seed distributor of claim 12, wherein at least one-half of the surface area of the frustoconical surface comprises seed outlet openings.

14. The seed distributor of claim 11, wherein:

a. a third seed flow path is defined by the radial space between the upper retaining portion of the restricting assembly and an interior surface of the seed distribution housing; and b. the first seed flow path, second seed flow path, and third seed flow path are oriented such that:

i. at low seed flow rates the seed travels primarily through the first seed flow path;

ii. at medium seed flow rates the seed flows through the first seed flow path and the second seed flow path; and iii. at high seed flow rates the seed flows through the first seed flow path, the second seed flow path, and the third seed flow path.

15. A seed distributor operable to deliver a substantially even annular flow of seed within a seed treater comprising:

a. a restricting assembly comprising:

i. an upper opening;

ii. a lower opening;

iii. a downwardly converging frustoconical surface having a porous portion;

b. a distributing assembly having a narrow upper portion and a wide lower portion, at least certain portions thereof are disposed within and radially spaced apart from the restricting assembly, thereby defining a first seed flow path; and c. structure supporting the distributing assembly and restricting assembly above the seed treating portion of the seed treater.

16. The seed distributor of claim 15, wherein at least one of the restricting assembly and the distributing assembly is adjustably mounted to the structure such that the orientation between the restricting assembly and the distributing assembly is adjustable.

17. The seed distributor of claim 16, wherein the narrow upper portion of the distributing assembly is disposed within the restricting assembly and the wide lower portion of the distributing assembly is not disposed within the restricting assembly.

18. The seed distributor of claim 17, wherein the wide lower portion of the distributing assembly radially extends beyond the lower retaining portion of the restricting assembly.

19. The seed distributor of claim 15, further comprising:

a. a second seed flow path defined by the porous portion of the restricting assembly; and b. a third seed flow path defined by the radial space between a top portion of the frustoconical surface of the restricting assembly and an interior surface of a seed distribution housing.

20. The seed distributor of claim 19, wherein:

a. at low seed flow rates the seed travels primarily through the first seed flow path;

b. at medium seed flow rates the seed flows through the first seed flow path and the second seed flow path; and c. at high seed flow rates the seed flows through the first seed flow path, the second seed flow path, and the third seed flow path.

* * * * *